(12) United States Patent
Jubelirer et al.

(10) Patent No.: US 7,643,283 B2
(45) Date of Patent: Jan. 5, 2010

(54) ADAPTIVE DOCK FOR USE WITH PERSONAL MEDIA PLAYERS

(75) Inventors: Matthew Jubelirer, San Diego, CA (US); Michael Baseflug, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 132 days.

(21) Appl. No.: 11/899,733

(22) Filed: Sep. 7, 2007

(65) Prior Publication Data

US 2009/0073642 A1 Mar. 19, 2009

(51) Int. Cl.
*H05K 5/00* (2006.01)
(52) U.S. Cl. .................................. 361/679.41
(58) Field of Classification Search ......... 361/686–687, 361/685, 728, 683, 752, 681; 439/638, 374
See application file for complete search history.

(56) References Cited

U.S. PATENT DOCUMENTS

| | | | |
|---|---|---|---|
| 5,633,782 A | | 5/1997 | Goodman et al. |
| 6,018,230 A | * | 1/2000 | Casey ........................ 320/114 |
| 6,231,371 B1 | * | 5/2001 | Helot ......................... 439/374 |
| 6,519,144 B1 | * | 2/2003 | Henrie et al. .......... 361/679.43 |
| 6,646,866 B2 | * | 11/2003 | Kao ...................... 361/679.26 |
| 6,765,789 B2 | * | 7/2004 | Yang .................... 361/679.45 |
| 6,906,917 B2 | * | 6/2005 | Lo et al. .................. 361/679.4 |
| 7,230,822 B2 | | 6/2007 | Langberg et al. |
| 2004/0150944 A1 | | 8/2004 | Byrne et al. |
| 2006/0250764 A1 | | 11/2006 | Howarth et al. |
| 2006/0280045 A1 | | 12/2006 | Ritsher |
| 2007/0015486 A1 | | 1/2007 | Marlowe |
| 2007/0035917 A1 | | 2/2007 | Hotelling et al. |
| 2007/0047198 A1 | | 3/2007 | Crooijmans et al. |
| 2007/0101039 A1 | | 5/2007 | Rutledge et al. |
| 2007/0108788 A1 | | 5/2007 | Shalam et al. |
| 2009/0009957 A1 | * | 1/2009 | Crooijmans et al. ......... 361/686 |

OTHER PUBLICATIONS

Audiovox iPod and Universal MP3 Player/Speaker/Dock (White), http://www.amazon.com/Audiovox-CE602IP/Universal-Docking-Station/dp/B000FCSTQA, printed Mar. 25, 2009, but posted on Amazon.com at least as early as Sep. 14, 2004, 5 pages.
Mondo wireless iPod docking station, http://www.ubergizmo.com/15/archives/2007/05/mondo wireless iPod docking station, posted May 14, 2007, 4 pages.

* cited by examiner

*Primary Examiner*—Jean F Duverne
(74) *Attorney, Agent, or Firm*—Mayer & Williams PC

(57) ABSTRACT

An adaptive dock for use with media players of varying form factors is provided by an arrangement in which a device connector is located on a moveable sled that is located in the dock's base unit. A device-specific dock insert is arranged for removable engagement with the base unit to allow the base to have applicability to different media players by using the appropriately configured insert. The insert includes a device receiving space having an opening that is located to expose the media player's accessory connector. The insert further includes an actuator that slidably engages with a cam that is located on the sled to impart a lateral motion to the sled as the insert is placed downward into the dock's base unit so as to align the device connector on the sled with the opening in the insert.

19 Claims, 5 Drawing Sheets

*FIG. 1*
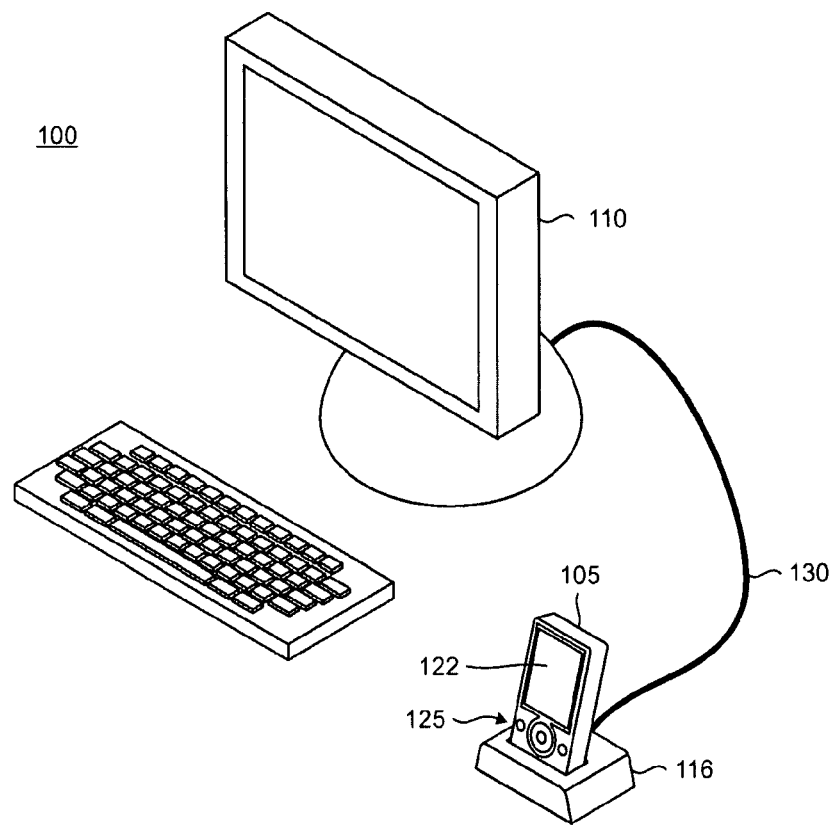
*FIG. 2A*                *FIG. 2B*
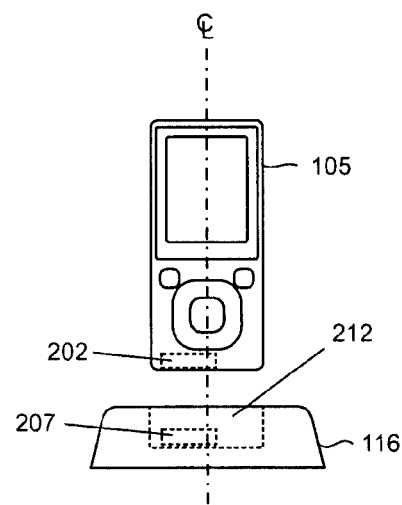     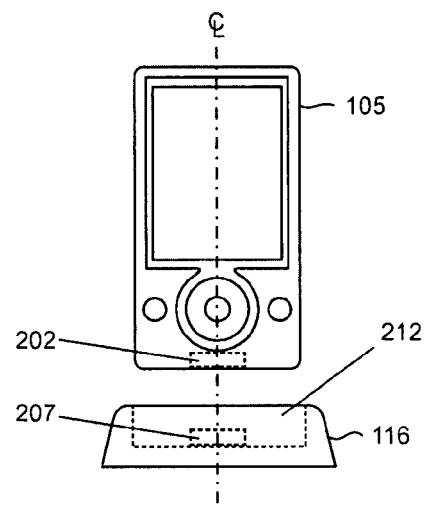

*FIG. 7A*
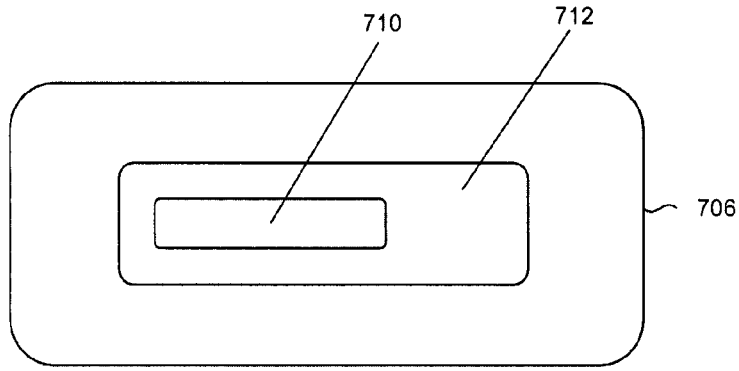
*FIG. 7C*
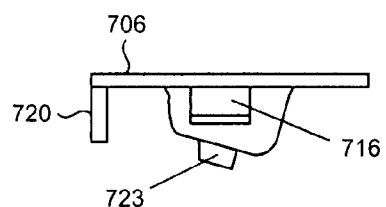
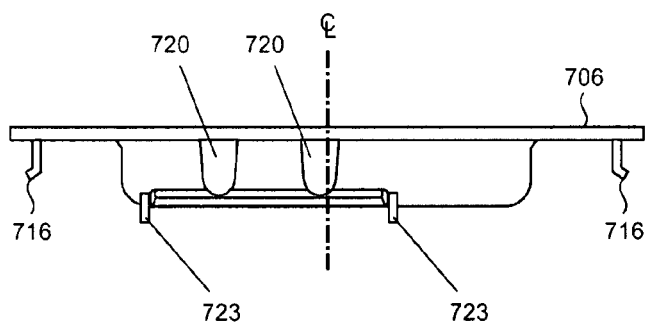
*FIG. 7B*
*FIG. 8A*
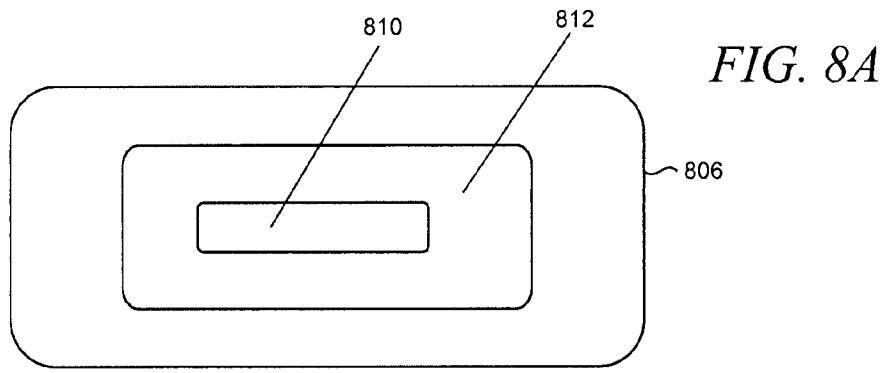
*FIG. 8C*
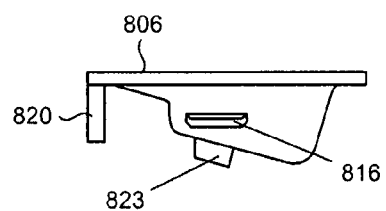
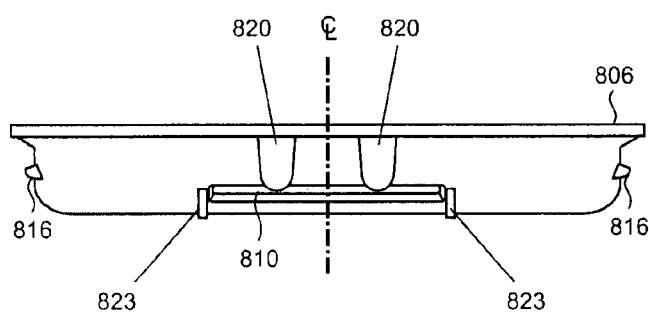
*FIG. 8B*

ADAPTIVE DOCK FOR USE WITH PERSONAL MEDIA PLAYERS

BACKGROUND

Personal media players that enable users to store and render a variety of media content such as music, photographs, and video are enjoying widespread popularity as performance and features such as storage capacity and continue to increase while maintaining attractive pricing. In addition to the market for the personal media players themselves, accessories such as earphones, chargers, car kits, and carrying cases, are presenting significant opportunities for manufacturers and retailers to develop additional revenue sources within the large media player market. One example of a popular personal media player accessory is a dock with which a user may connect the player to another device such as a personal computer, television, or other electronic device to communicate and share data, for example.

Personal media players are often offered with a variety of different features to enable sale at varying price points. It is not unusual for a manufacturer to offer multiple product types or lines to help tailor a personal media player to a specific target market segment. However, it is not always efficient or possible for retailers to carry a lot of device-specific accessories for each different personal media player. As a result, accessory manufacturers are motivated to develop products that are applicable to a wide variety of personal media players while maintaining both backwards and forwards compatibility, respectively, with older and newer models of players. However, most manufacturers want to avoid user perception that a particular accessory is "universal" which often connotes a compromised product that is not very well tailored to that user's specific media player.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An adaptive dock for use with media players of varying form factors is provided by an arrangement in which a device connector is located on a moveable sled that is located in the dock's base unit which houses the functional elements such as electronics required to implement communication between the media and an external device such as a personal computer. A device-specific dock insert is arranged for removable engagement with the base unit to allow the base to have applicability to different media players by using the appropriately configured insert. The insert includes a device receiving space having an opening that is located to expose the media player's accessory connector so that it may be mateably engaged with the device connector when the player is inserted into the dock. The insert further includes an actuator that slidably engages with a cam that is located on the sled to impart a lateral motion to the sled as the insert is placed downward into the dock's base unit so as to align the device connector on the sled with the opening in the insert.

In an illustrative example, the device-specific dock insert includes tabs that are configured to be removable engaged with the base unit in a snap fit configuration. The insert further includes a rib that engages in a mating slot adjacent to the device connector on the sled to lock the sled in place when the insert is placed into the base unit. The interaction between the actuator and the cam can impart relatively large motions to the sled while the interaction between the rib and slot provides relatively fine final positioning of the sled and device connector as the insert is snapped into its installed position in the base unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 1 shows an illustrative media player docking environment in which a personal media player is coupled to a personal computer using a dock;

FIGS. 2A and 2B show several illustrative personal media players that vary by size, capabilities, and the location of the docking connector;

FIGS. 7A, 7B, and 7C are respective top, front, and side views of a first illustrative device-specific dock insert;

FIGS. 8A, 8B, and 8C are respective top, front, and side views of a second illustrative device-specific dock insert;

Like reference numerals indicate like elements in the drawings.

DETAILED DESCRIPTION

Figure 3:
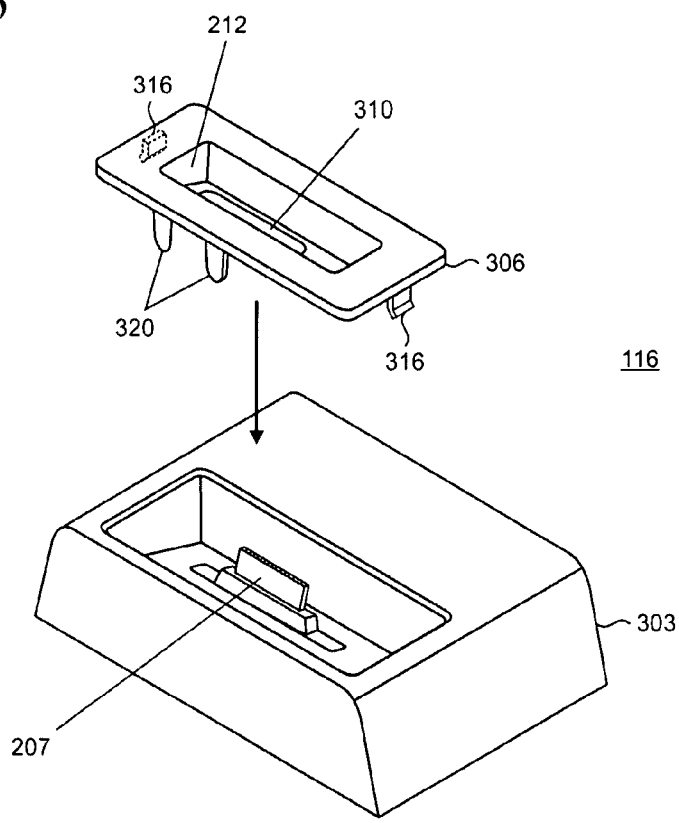
FIG. 3 shows an illustrative adaptive docking arrangement in which a device-specific dock insert is removably engagable with an adaptive dock.

FIG. 1 shows an illustrative media player docking environment 100 in which a personal media player 105 is coupled to a personal computer ("PC") 110 using a dock 116. Docking the personal media player 105 to the PC 110 typically enables them to operatively communicate, for example, to synchronize data and share media content. The dock 116 also typically provides a charging functionality to charge an onboard battery in the personal media player 105 when it is docked. In some scenarios, the PC 110 is used to acquire and/or store media content such as music, video, software, games, etc., from local or online sources that can then be loaded onto the personal media player 105 using the dock 116. In other scenarios, the dock 116 is used to enable the personal media player 105 to be used as a data or playback source to render its content to the PC 110 or another device (not shown) such as a television or stereo system. Dock 116 is generally configured to position the docked personal media player 105 so that its display 122 may be readily seen and the controls 125 conveniently accessed.

The personal media player 105 may take any of a variety of common forms, for example, MP3 player (Moving Pictures Expert Group, MPEG-1, audio layer 3), portable multimedia player, pocket PC, smart phone, mobile phone, handheld game device, personal digital assistant, or other type of electronic device that can store and/or render media content such as audio, video, or multimedia. And while a PC 110 is shown in the illustrative environment 100 in FIG. 1, other devices may be coupled to the personal media player in some implementations of the present adaptive dock including a television, audio and stereo system, game console, multimedia center, set-top box, and the like.

Dock 116 is coupled to the PC 110, in this illustrative example, using a cable 130 that typically contains a multiplicity of conductors for carrying data, power, and control signals, for example. Cable 130 is typically coupled to an input/output ("I/O") port on the PC 110 such as a USB (Universal Serial Bus) or IEEE-1394 (Institute of Electrical and Electronics Engineers) port (not shown).

A pair of mating connectors are utilized to implement the connection between the personal media player 105 and the dock 116 as shown in FIGS. 2A and 2B. One of the connectors in the pair, commonly referred to as an accessory or output connector, is disposed in the personal media player, as indicated by reference numeral 202. A mating device connector 207 is disposed in the dock 116. The connectors 202 and 207 are typically configured and respectively oriented so that they are operatively coupled when a user inserts the personal media player 105 into the dock 116 through an opening into a device receiving space 212. As shown in FIGS. 2A and 2B, the device connector 207 is located within the device receiving space 212.

As a result of design and/or packaging factors, the accessory connector 202 may not necessarily be positioned about the centerline of the personal media player 105. As shown in FIG. 2A, the personal media player 105 is arranged in small form factor where the accessory connector 202 is offset to the left of the centerline. The device connector 207 is correspondingly offset within the device receiving space 212 which is configured in dimension to be relatively close fitting to the personal media player 105 to support it in the desired orientation while docked in dock 116.

As shown in FIG. 2B, the personal media player 105 is configured as a large form factor as compared with that shown in FIG. 2A. In this illustrative example, the large form factor personal media player 105 uses an accessory connector 202 that is approximately centered about its centerline. The device connector 207 is, accordingly, centered within the device receiving space 212 which is configured to be larger than that shown in FIG. 2A to accommodate the large form factor personal media player 105. It is emphasized that the connector configurations shown in FIGS. 2A and 2B are merely illustrative, and the particular form factors of the personal media player 105 and device receiving space 212 within dock 116, as well as the amount of connector offset may vary according to the requirements of a specific implementation.

In order to accommodate a variety of form factors and accessory device configurations, dock 116 is arranged to be adaptive by a base unit 303, as shown in FIG. 3, which interfaces with one of several device-specific dock inserts 306. The device-specific dock insert 306 is removably couplable to the base unit 303 and includes a device receiving space 212 that is configured to fit a particular device form factor. The device receiving space 212 is further arranged to include an opening 310 through which the device connector 207 may pass. Opening 310 is located within the device receiving space 212 to accommodate the position of the accessory connector 202 (i.e., whether centered or offset from the centerline). In this illustrative example, the device-specific dock insert 306 is removably coupled to the base unit 303 using tabs 316 which mateably engage with corresponding recesses in the base unit (not shown) using a snap fit engagement.

The device-specific dock insert 306 further includes actuators 320 that are configured to project substantially downward from the bottom surface of the insert. Actuators 320 are configured to slidably interact with a cam that is provided by a laterally moveable sled, as described below, in order to impart lateral motion to the device connector so as to align it with the opening 310. Accordingly, the lateral location of the actuators 320 on the device-specific dock insert 306 will typically vary according to the lateral location of the opening 310 within the device receiving space 212.

Figure 4A:
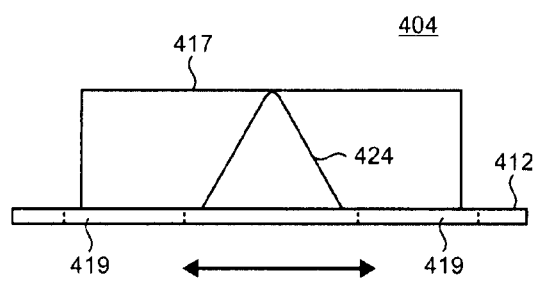
FIGS. 4A, 4B, and 4C are respective front, side and top views of an illustrative laterally moveable sled that is housed in the dock and arranged to interface with the device-specific dock insert shown in FIG. 3.
Figure 4B:
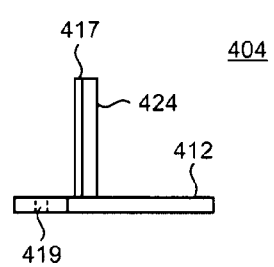
Figure 4C:
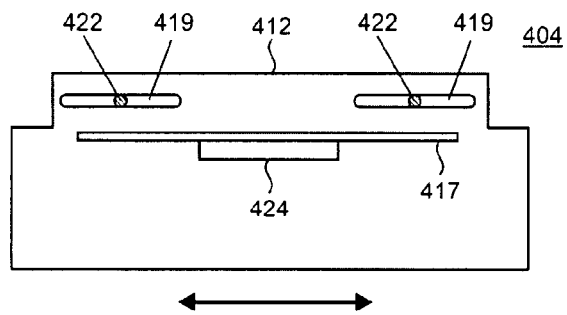
Figure 5A:
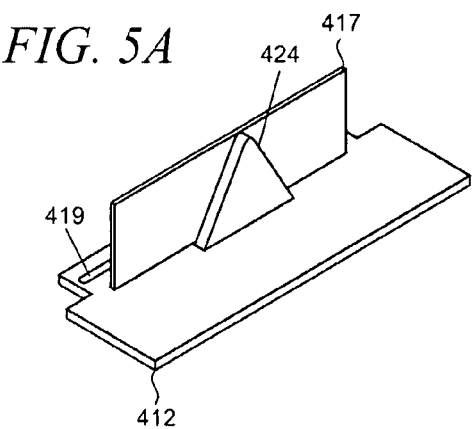
FIG. 5A is an isometric view of the sled shown in FIGS. 4A, 4B and 4C.

FIGS. 4A, 4B, and 4C are respective front, side and top views of an illustrative laterally moveable sled 404 that is housed in the dock base unit 303 and arranged to interface with actuators 320 of the device-specific dock insert 306 shown in FIG. 3. FIG. 5A is an isometric view of the sled 404.

The sled 404 comprises a horizontally planar base 412 from which a planar cam support 417 projects substantially orthogonally therefrom. As shown, base 412 includes slots 419 that capture posts 422 that are incorporated into the base unit 303. The location and orientation of the slots 419 allow lateral motion of the sled 404 with respect to the base unit 303 through slideable motion over the posts 422 (as indicated by the arrows in FIGS. 4A and 4C), but back and forth motion of the sled 404 is constrained. In alternative implementations other motion-constraining features may be utilized such as tracks or guides.

Projecting outward from the cam support 417 is a substantially triangular shaped cam 424 that is oriented, when the sled 404 is installed in the base unit 303, to slidably engage with one or both of the actuators 320 on the device-specific dock insert 306 when the insert 306 is snapped into the base unit 303.

Figure 5B:
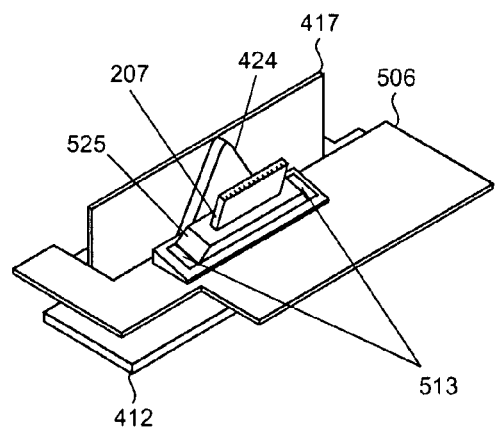
FIG. 5B shows the sled as that is fixedly coupled to a printed circuit board assembly which includes a device connector.

FIG. 5B shows the sled 404 as fixedly coupled to a printed circuit board assembly ("PCBA") 506 which is operatively coupled to the device connector 207. PCBA 506 is configured with circuitry (not shown) to implement various electronic features and functionalities provided by the dock 116 (FIG. 1). An I/O facility of the PCBA 506 (not shown) provides functional connectivity to the PC 110 via cable 130, as shown in FIG. 1. It is emphasized that the PCBA 506 is merely illustrative, and variations in PCBA layout, size, and orientation may vary from that shown in FIG. 5B as may be required by a specific requirement of an application of the present adaptive docking.

FIG. 5B also shows a set of slots 513 that are located on either side of the device connector 207 in a connector support member 525 which includes beveled surfaces that function to guide mating ribs on the device-specific dock insert 306 into the slots 513. The mating ribs project downwards from the bottom surface of the device-specific dock insert 306. The ribs are shown in FIGS. 7A-7C and FIGS. 8A-8C below and described in the accompanying text.

Figure 6A:
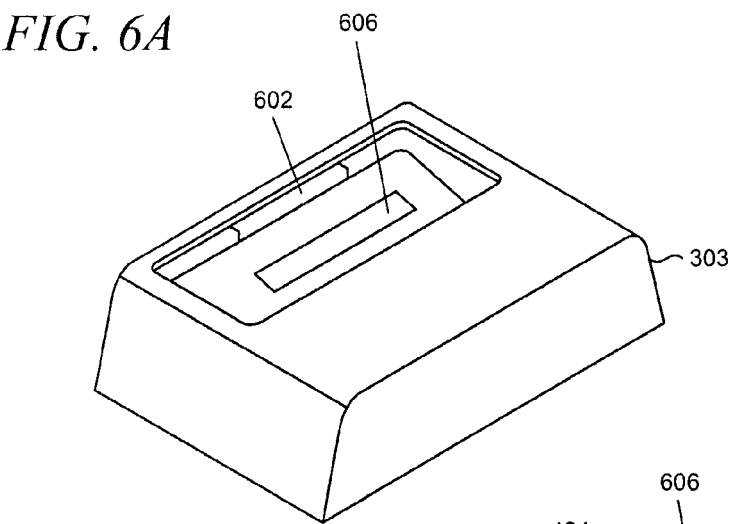
FIG. 6A is an isometric view of the rear and top surfaces of the dock base unit which shows an opening for a cam that interfaces with actuators on the device-specific dock insert and a laterally extending slot through which the device connector is exposable.
Figure 6B:
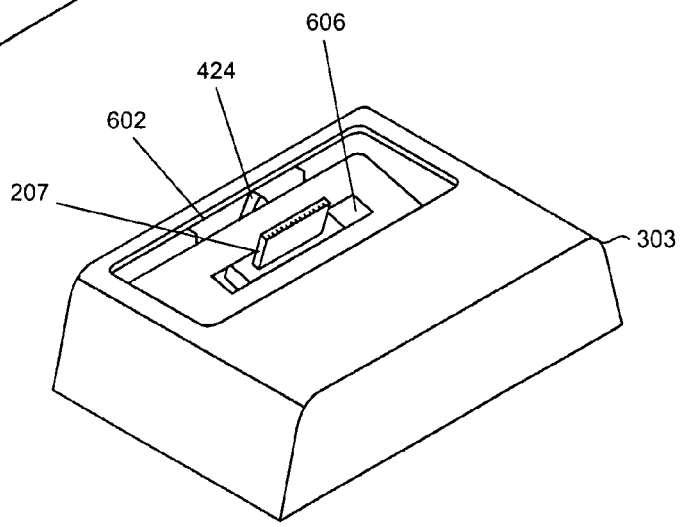
FIG. 6B is an isometric view of the dock base unit as assembled with its internal components including the sled, printed circuit board assembly, and device connector.

FIG. 6A is an isometric view of the rear and top surfaces of the dock base unit which shows a laterally extending opening 602 for the cam 424 that interfaces with actuators on the device-specific dock insert and a laterally extending slot 606 through which the device connector 207 is exposable. FIG. 6B is an isometric view of the dock base unit 303 as assembled with its internal components including the sled 404, PCBA 506, and device connector 207. As shown, the cam 424 is accessible to the actuators 320 (FIG. 3) on the device-specific dock insert 306 through the opening 602 when as the adapter is seated onto the base unit 303.

FIGS. 7A, 7B, and 7C are respective top, front, and side views of a first illustrative device-specific dock insert 706. In a similar manner to the device-specific dock insert 306 shown in FIG. 3, insert 706 includes device receiving space 712 through which an opening 710 is positioned in accordance with the location of the accessory connector 202 (FIG. 2A) in the personal media player 105. In this illustrative example, the device receiving space 712 and opening 710 are configured to interface with the small form factor personal media player shown in FIG. 2A in which the accessory connector 202 is offset from the centerline of the player. Actuators 720 are thus offset with respect to the centerline of the insert to be able to move the sled 404 through slideable engagement with the cam 424 (FIGS. 4A-4C) into a position which facilitates mateable coupling between the accessory connector 202 in the personal media device 105 (FIG. 1) and the device connector 207. Tabs 716 are provided which mateably engage with corresponding recesses in the base unit 303 (FIG. 3) using a snap fit engagement.

A pair of ribs 723 are positioned on either side of opening 710 and project downward from the bottom of the device receiving space 712. Ribs 723 are utilized to provide the fine positioning of the sled 404 with respect to the device-specific dock insert 706 via removal engagement with the corresponding slots 513 adjacent to the connector 207 as shown in FIG. 5B as the insert 706 is snap fit into final position in the base unit 303. Once the ribs 723 are so engaged, the sled 404 is locked in a fixed position.

FIGS. 8A, 8B, and 8C are respective top, front, and side views of a second illustrative device-specific dock insert 806 in which the device receiving space 812 and opening 810 are configured to interface with the large form factor personal media player shown in FIG. 2B in which the accessory connector 202 is substantially centered with the centerline of the player. Actuators 820 are accordingly spaced symmetrically about the centerline of the device-specific dock insert 806. Tabs 816 and ribs 823 are arranged and perform similar functions as those elements shown in FIGS. 7B and 7C.

Figure 9A:
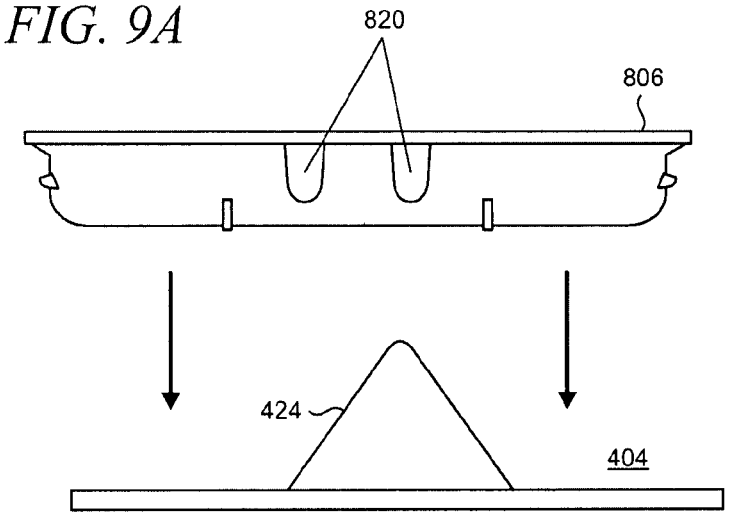
FIGS. 9A, 9B and 9C show a sequence of views of the dock insert actuators in operative engagement with the cam on the sled, where such engagement may impart lateral motion to the sled.
Figure 9B:
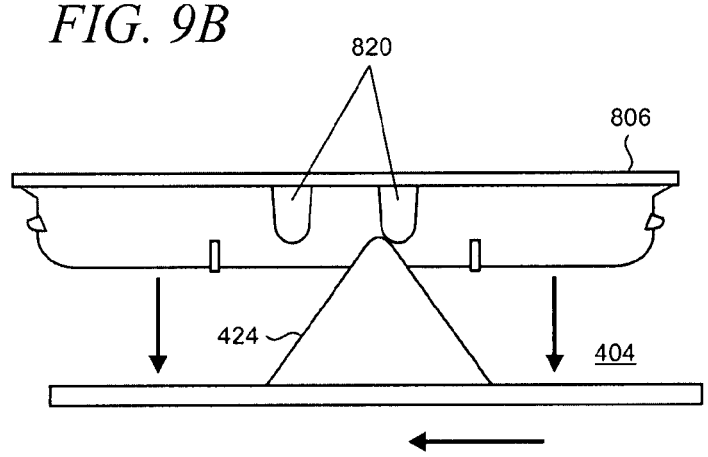
Figure 9C:
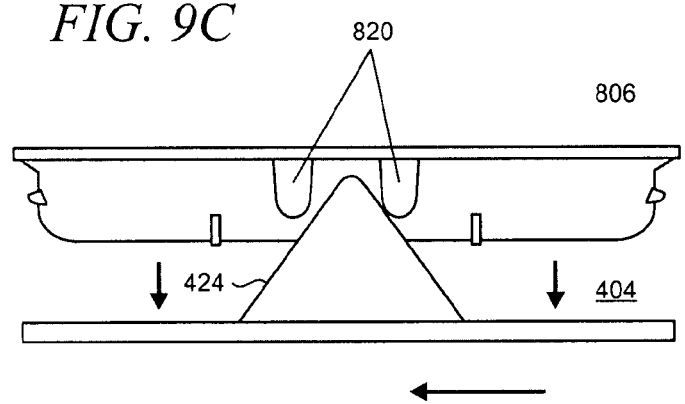
Figure 9D:
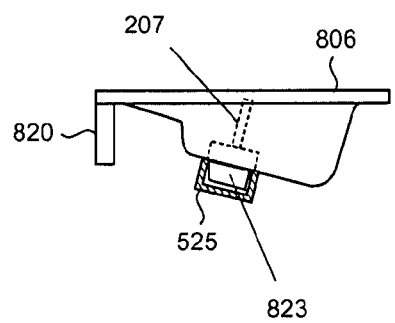
FIG. 9D is a side view of downwardly extending ribs as engaged in rib-receiving slots that are adjacently disposed to the device connector on the printed circuit board assembly.

FIGS. 9A, 9B and 9C show a sequence of views of the dock insert actuators (such as actuators 820 shown in FIGS. 8B and 8C) in operative engagement with the cam 424 on the sled 404 which may impart lateral motion to the sled 404. Note that some elements including the dock insert opening, PCBA, device connector, and base unit are not shown for clarity. FIG. 9A shows the actuators 820 prior to be slidably engaged with the cam 424. When a user begins to place the device-specific dock insert 806 into the base unit, as shown in FIG. 9B, the downward motion of the insert forces one of the actuators 820 to bear against the cam 424 and push the sled 404 laterally as the actuator 820 follows the cam's profile. As shown in FIG. 9C, the lateral motion continues until the ribs 823 touch down upon the supporting portion of the connector 207 which guides the ribs into the slots 513 as shown in FIG. 5B and FIG. 9C. The interaction between the actuator 820 and cam 424 can thus impart relatively large motions to the sled 404 while the interaction between the ribs 823 and slots 513 provide relatively fine final positioning as the device-specific dock insert 806 is snapped into its installed position in the base unit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A dock adapted for use with a media player, comprising:
a base unit;
a moveable sled in the base unit, the sled including a device connector that is configured for mateable engagement with a mating accessory connector in the media player, and further including a cam; and
a dock insert that removably mateably interfaces with the base unit, the dock insert including i) a receiving space that is configured to hold a portion of the media player, ii) an opening into the receiving space that is arranged to expose the accessory connector when the media player is placed into the dock insert, and iii) an actuator that is arranged for interaction against the cam so as to impart a force to the sled to position the device connector at the opening when the dock insert is mateably engaged with the base unit.

2. The dock of claim 1 in which the sled is slidably movable over a guide, the guide being configured to substantially limit the movement of the sled to lateral movement.

3. The dock of claim 2 in which the guide comprises one or more posts that interface with one or more corresponding slots in the sled.

4. The dock of claim 2 in which the guide comprises a track in which the sled is slidably guided.

5. The dock of claim 1 further including a printed circuit board assembly that implements electronic functionality provided by the dock.

6. The dock of claim 5 in which the printed circuit board assembly is mounted on the sled.

7. The dock of claim 1 further including an output cable connector.

8. The dock of claim 7 in which the output cable is selected from one of USB cable or IEEE-1394 cable.

9. The dock of claim 1 in which the cam comprises an angled surface over which the actuator follows so as to convert downward motion from the actuator into lateral motion of the sled.

10. The dock of claim 1 in which the cam profile is shaped substantially as a triangle.

11. The dock of claim 1 in which the dock insert and base unit engage using a tab and slot arrangement to facilitate a snap fit.

12. The dock of claim 1 in which the cam is accessed through an opening in the base unit.

13. The dock of claim 1 in which the device connector is exposed through an opening in the base unit.

14. A dock insert that is configured for removably mateable engagement with a dock base unit, comprising:
a media device receiving portion that is arranged to hold a portion of a media device removably fixedly in an orientation that facilitates access to controls on the media device by a user, the receiving portion having an opening that is configured to expose an accessory connector in the media device when held in the receiving portion;
at least one actuator arranged for slidably engaging with a cam as the dock insert is being mateably engaged with the dock base unit, the cam coupled to impart substantially horizontal planar motion to a device connector disposed in the base unit; and one or more ribs that engage in corresponding slots in an element on a sled on which a device locator is located to lock the sled in a fixed position when the dock insert is mateably engaged with the dock base unit.

15. The dock insert of claim 14 further including one or more tabs that are arranged for a snap fit with tab receiving areas disposed in the base unit.

16. The dock insert of claim 14 in which the actuator is configured to impart movement to the cam so as to align the device connector with the opening.

17. A method for packaging a dock product for sale, the dock product being arranged for use with a plurality of different media devices, the method comprising the steps of:

providing a base unit having installed therein a moveable sled, the sled including a device connector that is configured for mateable engagement with a mating accessory connector with each of the different media devices and further including a cam, the base unit being arranged to be removably coupled with a dock insert; and packaging a plurality of device-specific dock inserts with the base unit, each of the device-specific dock inserts being tailored to interface with respective ones of the different media devices, each of the device-specific dock inserts including i) a media device receiving portion that is arranged to hold a portion of a media device to which it is tailored, the receiving portion having an opening that is configured to expose an accessory connector in the media device when held in the receiving portion, and ii) an actuator arranged for interacting with the cam to impart motion to the sled to align the device connector with the opening for the accessory connector when the device-specific dock insert is coupled with the base unit.

18. The method of claim 17 in which ones of the plurality of different media devices are selected from a group consisting of personal digital assistants, MP3 players, multimedia players, smart phones, mobile phones, personal digital assistants, portable game devices, pockets PCs, or an electronic device which combines functionalities provided by a plurality of members of the group.

19. The method of claim 17 including a further step of providing additional device-specific dock inserts that are tailored to new media devices when such new media devices become available.

* * * * *